March 8, 1927.  L. C. HUFF  1,619,937
VALVE
Filed June 15, 1925
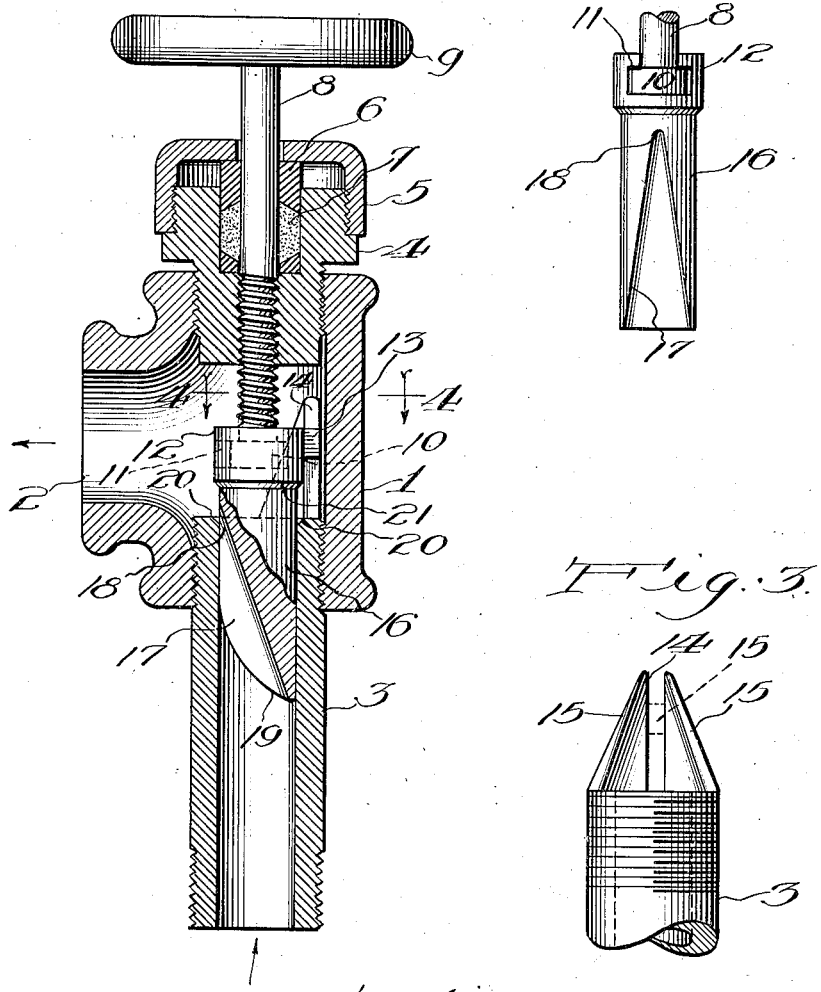
Inventor:
Lyman C. Huff,
by Frank L. Belknap
Atty.

Patented Mar. 8, 1927.

1,619,937

UNITED STATES PATENT OFFICE.

LYMAN C. HUFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA.

VALVE.

Application filed June 15, 1925. Serial No. 37,124.

This invention relates to valves and refers more particularly to a special type of control valve adapted to be interposed in lines transporting viscous liquids such as heavy petroleum oils for use, for instance, as fuel and the like, or for the transportation of water containing suspended foreign substantially solid particles therein.

The novel construction of the present invention possesses many advantages. It provides a valve having a tapering or grooved inlet, the purpose of which is to gradually reduce the cross sectional area of the inlet to the valve, thus eliminating all ledges or shoulders upon which fine particles of foreign matter such as carbon, sand, salt or the like which may be carried in suspension in the liquid lodge and collect, finally building up to such an extent that the valve is clogged.

In the drawings, Fig. 1 is a cross sectional view of the valve construction as an entire assembly. Fig. 2 is an enlarged detail view of the valve proper with its tapering groove. Fig. 3 is a face view of the mechanism for guiding the valve disk to prevent turning thereof. Fig. 4 is a cross sectional view taken on lines 4—4 of Fig. 1.

Referring in detail to the drawings, Fig. 1 designates an angle type of valve in which the body 1 is provided with the outlet 2 to which is connected the inlet pipe 3. This angle type of valve has openings substantially at right angles to the opening 2, the lower opening to accommodate the screw thread of the inlet pipe 3, and the upper opening registering with the screw threaded closure cap 4. A gland nut 5 registers with the screw threaded cap 4 to hold same in place, the packing designated 6 and 7 respectively being interposed therebetween to prevent leakage. It is understood of course, that the members 4, 5, 6 and 7 are centrally apertured to allow for free rotary movement of the valve stem 8 which may be provided with the hand wheel 9. The member 6 for instance, may designate a washer whereas 7 may designate a flexible lubricated packing, although this will be regulated to suit the conditions of use. The lower end of the valve stem 8 is provided with the enlarged boss 10. This boss 10 is adapted to be inserted in the groove 11 of the valve disk 12. The purpose of this construction will be hereinafter explained.

It is not intended that the valve disk 12 shall rotate, but on the contrary it is adapted to be reciprocated. To prevent rotation or turning of the valve disk 12 it may be provided with the lug 13 projecting from the wall thereof at a suitable point, which lug 13 is adapted to register with the slot 14 formed by the upwardly projecting forked portion 15 of the inlet pipe 3, the arrangement being such that the lug 13 will slide or reciprocate in the slot without turning. It will thus be seen that as the hand wheel 9 and valve stem 8 are rotated, the boss 10 will also be rotated, there being allowance for free rotation whereas the valve disk 12 will only reciprocate and will not rotate.

As a novel feature of the present invention, the valve disk 12 may be provided with the extension 16 which may be formed integral therewith, if desired, which extension 16 may be grooved or recessed as shown at 17, this groove or recess taking the form of a tapering cone, the apex of which is adjacent the disk 12. In other words the groove or recess tapers inwardly in the direction of the disk 12 and the apex thereof shown at 18 is preferably rounded in order that there will be no sharp corners on this extension 16 which will afford a place for lodgment of foreign particles in the liquid, the flow of which is being regulated by controlling the valve. The outer edges of the grooved portion 17 are preferably rounded as shown at 19 (Fig. 1) for the same purpose.

The valve construction shown in the present invention is particularly adapted for use in lines transporting heavy or viscous petroleum oils which contain suspended therein coke-forming or pitch-like particles which will not settle out on standing and which only pass through the ordinary globe valve, thus precipitating carbon particles. These precipitated particles gradually build up and eventually clog the valve rendering it unserviceable. I have shown the valve in one position namely vertical, and I have shown the invention as applied to an angle type of valve. It is to be understood that the valve is for use in any position, vertical or horizontal, with the valve stem at top or bottom, and is for use with types of valves other than angle valves.

The valve seat 20 is adapted to register with the tapering portion 21 of the end surface of the disk 12 to close the valve when not in use. It will be readily seen that the tapering groove 17 gradually reduces the cross section area of the inlet 3 to the orifice opening of the valve, for the purposes heretofore described. The tapering groove has a smooth finish so that all particles of foreign matter are swept forward and out through the valve opening. The tapering groove also provides an orifice opening of sufficient size to pass small particles of carbon and foreign matter, even though throttled down and discharging a very small quantity of oil.

It will be readily seen that it is unlike the ordinary globe or needle valve where the valve opening extends clear around the circumference of the valve disk, but in this particular design of valve, the opening is concentrated at one point, giving a larger orifice through which foreign particles can pass unobstructed. The tapering opening discharges directly in front of the outlet of the valve body so that there are no obstructions immediately in front of the opening. The valve will give the effect when adjusted in any position of its opening, of gradually tapering the inlet or approach to the valve to a converging point, which point is the orifice desired through which will pass regulated amounts of oil.

Thus, it will be seen that I provide a control valve which has the orifice opening concentrated at a given point so as to have maximum cross dimensions, diameter, or area at a given point, through which regulated amounts of oil may pass the regulation of course, depending upon the particular adjustment of the orifice desired. Concentrating the valve opening at a single point, permits larger particles of carbon and foreign matters to pass through it unobstructed, and it is possible to secure a very fine adjustment permitting only a small quantity of oil to pass through the orifice without the danger of clogging of the valve.

The elimination of sharp edges, shoulders and the like, upon which foreign particles usually build up, is accomplished by causing the oil to flow through a tapering or cone shaped opening as it approaches the orifice opening.

Steam may be introduced if desired, through the valve body by plugging a connection therein at a point, say opposite the outlet 2. The fittings for the valve are preferably made of forged steel capable of withstanding high pressures.

I claim as my invention:

1. The combination with a T-joint of conventional construction, of a valve structure adapted to be applied thereto, comprising a closure cap having a central bore for one of the alined openings of said T-joint, a valve stem adapted to extend through the bore in said closure cap, packing means associated with said closure cap to prevent leakage around said valve stem, an inlet pipe extending into the opposite alined openings of said T-joint, said inlet pipe terminating in a slotted projection extending into the T-joint, a reciprocable valve body having a seat adapted to cooperate with a seat carried by said inlet pipe, a connection between said valve stem and valve body for permitting rotation of the valve stem relative to said valve body, whereby said valve is reciprocated by rotation of said valve stem, a projection carried by said valve body adapted to ride in said slotted projection of the inlet pipe, to prevent rotation of said valve body.

2. The combination with a T-joint of conventional construction, of a valve structure adapted to be applied thereto, comprising a closure cap having a central bore for one of the alined openings of said T-joint, a valve stem adapted to extend through the bore in said closure cap, packing means associated with said closure cap to prevent leakage around said valve stem, an inlet pipe extending into the opposite alined openings of said T-joint, said inlet pipe terminating in a slotted projection extending into the T-joint, a reciprocable valve body having a seat and an extension beyond said seat, the extension being provided with a tapering opening gradually reducing in cross-sectional area toward the discharge end of the valve, means connecting said valve stem with said valve body, to permit reciprocation of said valve body, means carried by said valve body adapted to cooperate with the slotted projection of said inlet pipe, to prevent rotation of said valve body.

3. The combination with a T-joint of conventional construction, of a valve structure adapted to be applied thereto without alteration of said T-joint, comprising a closure cap for one of the alined openings of said T-joint, a valve stem rotatably mounted in said closure cap, an inlet pipe extending within the opposite alined openings of said T-joint, a reciprocable valve having a valve seat carried by said valve stem, a cooperating valve seat carried by said inlet pipe, and additional cooperating means carried by said inlet pipe and valve for preventing rotation of said valve.

LYMAN C. HUFF.